US011982321B2

United States Patent
Matsunaga

(10) Patent No.: US 11,982,321 B2
(45) Date of Patent: May 14, 2024

(54) MULTIPLE-DISC FRICTION CLUTCH

(71) Applicant: Honda Motor Co., Ltd., Tokyo (JP)

(72) Inventor: Naoya Matsunaga, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/121,761

(22) Filed: Mar. 15, 2023

(65) Prior Publication Data
US 2023/0313844 A1 Oct. 5, 2023

(30) Foreign Application Priority Data

Mar. 30, 2022 (JP) ................. 2022-055128

(51) Int. Cl.
*F16D 13/56* (2006.01)
*F16D 13/58* (2006.01)
*F16D 13/70* (2006.01)

(52) U.S. Cl.
CPC .................. *F16D 13/56* (2013.01)

(58) Field of Classification Search
CPC .......... F16D 13/52–2013/565; F16D 23/12–2023/123; F16D 43/21–218; F16D 13/56; F16D 13/583; F16D 13/70; F16D 2300/24
See application file for complete search history.

(56) References Cited

U.S. PATENT DOCUMENTS 1,757,517 A * 5/1930 Eaton ...................... F16D 13/52
    192/209
2015/0001028 A1* 1/2015 Yoshimoto .............. F16D 13/56
    192/70.23

FOREIGN PATENT DOCUMENTS

WO   WO 2011/049109 A1   4/2011

* cited by examiner

*Primary Examiner* — Tinh Dang
(74) *Attorney, Agent, or Firm* — Birch, Stewart, Kolasch & Birch, LLP

(57) ABSTRACT

A multiple-disc friction clutch includes clutch centers, which are first and second clutch centers. The first clutch center is axially supported by an output rotation shaft in a relatively non-rotatable manner. The second clutch center is supported by the first clutch center in a relatively rotatable manner. Elastic members are interposed between the first and the second clutch centers and are compressed and deformed by relative rotation of the first and the second clutch centers so as to transmit power. The second clutch center has a side wall that faces a pressure plate and has an opening part that penetrates in an axial direction, at a position facing the elastic member of the side wall. A push rod is inserted and fitted in the opening part and is moved in the axial direction by compression deformation of the elastic member so as to press the pressure plate.

7 Claims, 8 Drawing Sheets

MULTIPLE-DISC FRICTION CLUTCH

BACKGROUND

1. Technical Field

The present invention relates to a multiple-disc friction clutch.

2. Description of the Background

In two-wheeled vehicles, a multiple-disc friction clutch is generally used in order to transmit or shut off power from an internal combustion engine to a transmission.

In such a multiple-disc friction clutch for a two-wheeled vehicle, rotation on an output side may exceed rotation on an input side, that is, what is called "back torque" may occur. In one example, in response to generation of back torque, a cam mechanism operates to reduce clutch capacity (degree of transmitted torque) and thereby prevents rapidly braking a tire (for example, Patent literature 1).

CITATION LIST

Patent Literature

Patent literature 1: WO 2011/049109

The multiple-disc friction clutch that is disclosed in Patent literature 1 has a clutching part between a clutch housing, to which drive torque is input, and a clutch center, which is coupled to an output rotation shaft. The clutching part includes a plurality of disc members (plate members) that transmit and shut off torque. The clutching part is pressed against the clutch center by a pressure plate.

Moreover, a back-torque limiter mechanism is provided between the clutch center and the output rotation shaft.

The back-torque limiter has a cam mechanism that is implemented by engagement of protrusions between a first ring, which corotates with the clutch center, and a second ring, which corotates with the output rotation shaft.

In transmitting torque from an internal combustion engine to a transmission, perpendicular engagement surfaces perpendicular to a rotation direction of respective protrusions of the first ring and the second ring engage with each other without sliding. Thus, torque is transmitted from the first ring to the second ring and is then transmitted from the second ring to the output rotation shaft.

That is, torque is transmitted from the internal combustion engine to the transmission without reducing the transmitted torque.

On the other hand, at the time back torque is applied due to rotation on an output side exceeding rotation on an input side, inclined engagement surfaces having inclination angles relative to a surface perpendicular to the rotation direction of respective protrusions of the first ring and the second ring engage and come into sliding contact with each other. Then, a thrust force acts on the first ring to move the first ring in an axial direction away from the second ring.

In response to the first ring moving together with the clutch center, the pressure plate moves in a direction opposite to the direction of pressing the clutching part, whereby the force for pressing the clutching part is decreased, and the clutch capacity is reduced.

BRIEF SUMMARY

The cam mechanism of the back-torque limiter that is disclosed in Patent literature 1 has the perpendicular engagement surface and the inclined engagement surface at each protrusion of the first ring and the second ring. In this structure, while the perpendicular engagement surfaces of the first ring and the second ring are in contact with each other, a gap is formed between the inclined engagement surfaces of the first ring and the second ring.

This gap can cause occurrence of a lift of the pressure plate due to impact at the time of driving the inclined surfaces and thereby deteriorate operability of the clutch. The term "operability," as used herein, is intended to mean lever hitting, which is a phenomenon that a lift occurs due to impact between the inclined engagement surfaces at the time of driving a slipper mechanism (driving the inclined surfaces), and accordingly a clutch lever is unintentionally moved following the lift.

The sliding contact between the inclined engagement surfaces of the first ring and the second ring moves the pressure plate and thereby reduces the clutch capacity. That is, the clutch capacity is determined by the inclination angles of the inclined engagement surfaces and is difficult to adjust.

In the case in which variations in torque are great at the time of starting a vehicle, the first ring and the second ring may repeat relative rotation in mutually opposite directions in reaction to impact between the perpendicular engagement surfaces. At this time, sliding contact between the inclined engagement surfaces may occur to reduce the clutch capacity, resulting in not smooth start of the vehicle.

In relation to transmission using a cam mechanism, in order to achieve a desired clutch capacity, the inclination angles, the number of cams, and the number of clutch friction materials on the pressure plate side, are specified.

Unfortunately, these parameters are limited by allowable surface pressure of the cam, and therefore, the limit of the clutch capacity is low in specifications of aluminum cams that are practically used.

The present invention has been achieved in view of these circumstances, and an object of the present invention is to provide a multiple-disc friction clutch that has an excellent operability, enables smooth starting, and is easy to adjust in clutch capacity.

In order to achieve the above object, the present invention provides a multiple-disc friction clutch including a clutch housing, clutch centers, a clutching part, a pressure plate, and a biasing member. The clutch housing is axially supported by an output rotation shaft in a rotatable manner and is configured to receive drive torque from an internal combustion engine. The clutch centers are coupled to the output rotation shaft. The clutching part includes a plurality of plate members that are configured to transmit and shut off torque between the clutch housing and the clutch centers. The pressure plate is configured to press the clutching part against the clutch center. The biasing member biases the pressure plate in a direction of pressing the clutching part.

The clutch centers include a first clutch center and a second clutch center. The first clutch center is axially supported by the output rotation shaft in a relatively non-rotatable manner. The second clutch center is supported by the first clutch center in a relatively rotatable manner and holds the clutching part between the pressure plate and the second clutch center. Elastic members are interposed between the first clutch center and the second clutch center and are configured to be compressed and deformed by relative rotation of the first clutch center and the second clutch center so as to transmit power. The second clutch center has a side wall that faces the pressure plate and has an opening part that penetrates in an axial direction, at a position facing the elastic member of the side wall. A push rod is inserted and fitted in the opening part and is configured to be moved in the axial direction by compression deformation of the elastic member so as to press the pressure plate.

In this structure, in response to an excessive force applied from an input side or an output side of this multiple-disc friction clutch, the first clutch center and the second clutch center greatly relatively rotate to cause the elastic member, which is interposed therebetween, to be compressed and deformed to push the push rod, which is inserted and fitted in the opening part of the second clutch center. The push rod is then protruded from the opening part, and it presses and pushes back the pressure plate that is biased by the biasing member, whereby clutch capacity is reduced.

In one preferred embodiment of the present invention, the push rod may be configured to be moved in the axial direction by the elastic member that is compressed and deformed only when power is transmitted from the first clutch center to the second clutch center.

In this structure, in response to an excessive back torque applied from the output rotation shaft side, torque is transmitted from the first clutch center to the second clutch center. At the time of this torque transmission, the elastic member is compressed and deformed to move the push rod in the axial direction, and the push rod presses and pushes back the pressure plate that is biased by the biasing member, to reduce a force for pressing the clutching part, whereby clutch capacity is reduced.

The elastic member, which is compressed and deformed when torque is transmitted from the first clutch center to the second clutch center, is not compressed and deformed when torque is transmitted from the second clutch center to the first clutch center in a reverse manner. In this case, the push rod does not push back the pressure plate, and clutch capacity is not reduced.

In one preferred embodiment of the present invention, a plurality of the push rods may be provided to the side wall of the second clutch center at equal intervals in a circumferential direction.

In this structure, the plurality of push rods, which are provided to the side wall of the second clutch center at equal intervals in the circumferential direction, uniformly apply forces of the push rods for pushing back the pressure plate that is biased by the biasing member, to the pressure plate, whereby smooth movement of the pressure plate is ensured.

In one preferred embodiment of the present invention, the push rod may be biased so as to be in contact with the elastic member, by a spring member.

In this structure, the push rod is biased to abut on the elastic member by the spring member, and thus, operation responsiveness of the pressure plate with respect to compression deformation of the elastic member can be adjusted.

In one preferred embodiment of the present invention, a gap may be provided between the push rod and the pressure plate.

In this structure, the gap is provided between the push rod and the pressure plate. When relative rotation in mutually opposite directions of the first clutch center and the second clutch center is repeated while variations in torque are great at the time of starting a vehicle, movement of the push rod based on compression deformation of the elastic member is absorbed by the gap between the push rod and the pressure plate with the use of compression deformation of the elastic member and stiffness of the spring member. Thus, the pressure plate is not pushed back, whereby reduction in clutch capacity is prevented, and starting operation is smoothly performed.

Power is transmitted between the first clutch center and the second clutch center via the elastic members, and therefore, a lift of the pressure plate, which occurs due to impact between parts, is very small, which hardly affects operability.

In addition, vibrations due to relative rotation between the first clutch center and the second clutch center are reduced, whereby stating operation is smoothly performed.

The clutch capacity can be easily adjusted by adjusting a filling efficiency of the elastic members into the spaces formed by the first and the second clutch centers, with the use of spacers, or by adjusting the gap through which the pressure plate is pushed back, with the use of a push rod having a different length.

In one preferred embodiment of the present invention, the push rod may include a first push rod for pressing the pressure plate and a second push rod being in pressure contact with the elastic member, and the first push rod and the second push rod may be spaced in a contactable manner by the spring member that is interposed therebetween in a compressed state.

In this structure, the first push rod and the second push rod are spaced in a contactable manner by the spring member that is interposed therebetween in a compressed state. When relative rotation in mutually opposite directions of the first clutch center and the second clutch center is repeated while variations in torque are great at the time of starting a vehicle, movement of the push rod based on compression deformation of the elastic member is absorbed by the gap between the first push rod and the second push rod that are separated from each other. Thus, the pressure plate is not pushed back, whereby reduction in clutch capacity is prevented, and starting operation is smoothly performed.

In the present invention, in response to an excessive force applied from an input side or an output side of the multiple-disc friction clutch, the first clutch center and the second clutch center greatly relatively rotate to cause the elastic member, which is interposed therebetween, to be compressed and deformed to push the push rod, which is inserted and fitted in the opening part of the second clutch center. The push rod is then protruded from the opening part, and it presses and pushes back the pressure plate that is biased by the biasing member, whereby clutch capacity is reduced.

Power is transmitted between the first clutch center and the second clutch center via the elastic members, and elastic deformation of the elastic members causes a very little delay in response, which hardly affects operability.

In addition, vibrations due to relative rotation between the first clutch center and the second clutch center are reduced by damping forces of the elastic members, whereby stating operation is smoothly performed.

The clutch capacity can be easily adjusted by exchanging the elastic member for an elastic member being different in modulus of elasticity, dimensions, and shape.

DETAILED DESCRIPTION

Hereinafter, an embodiment according to the present invention will be described on the basis of FIGS. 1 to 6.

Figure 1:
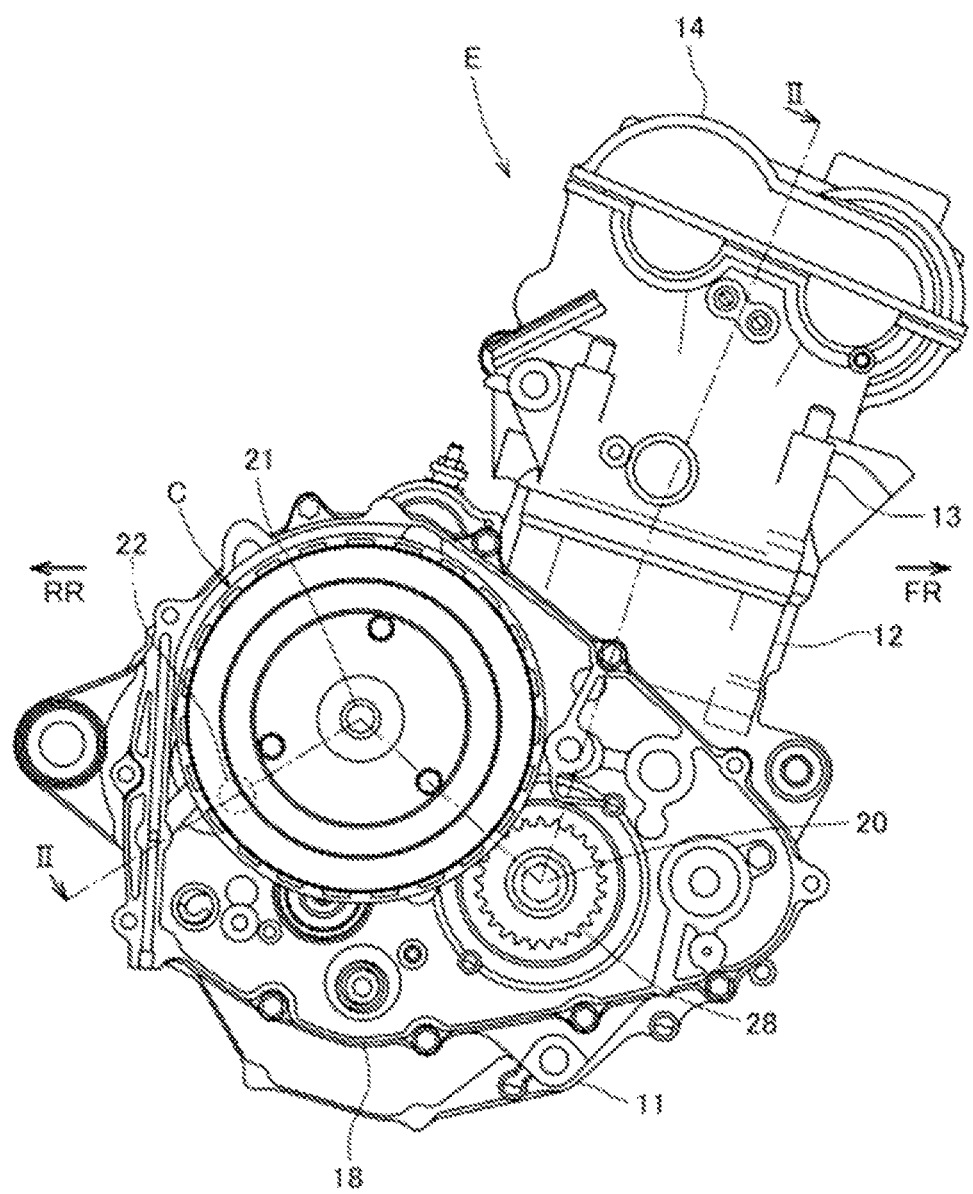
FIG. 1 is a partially omitted side view of the whole internal combustion engine according to one embodiment of the present invention, from which a right case cover is removed.
Figure 2:
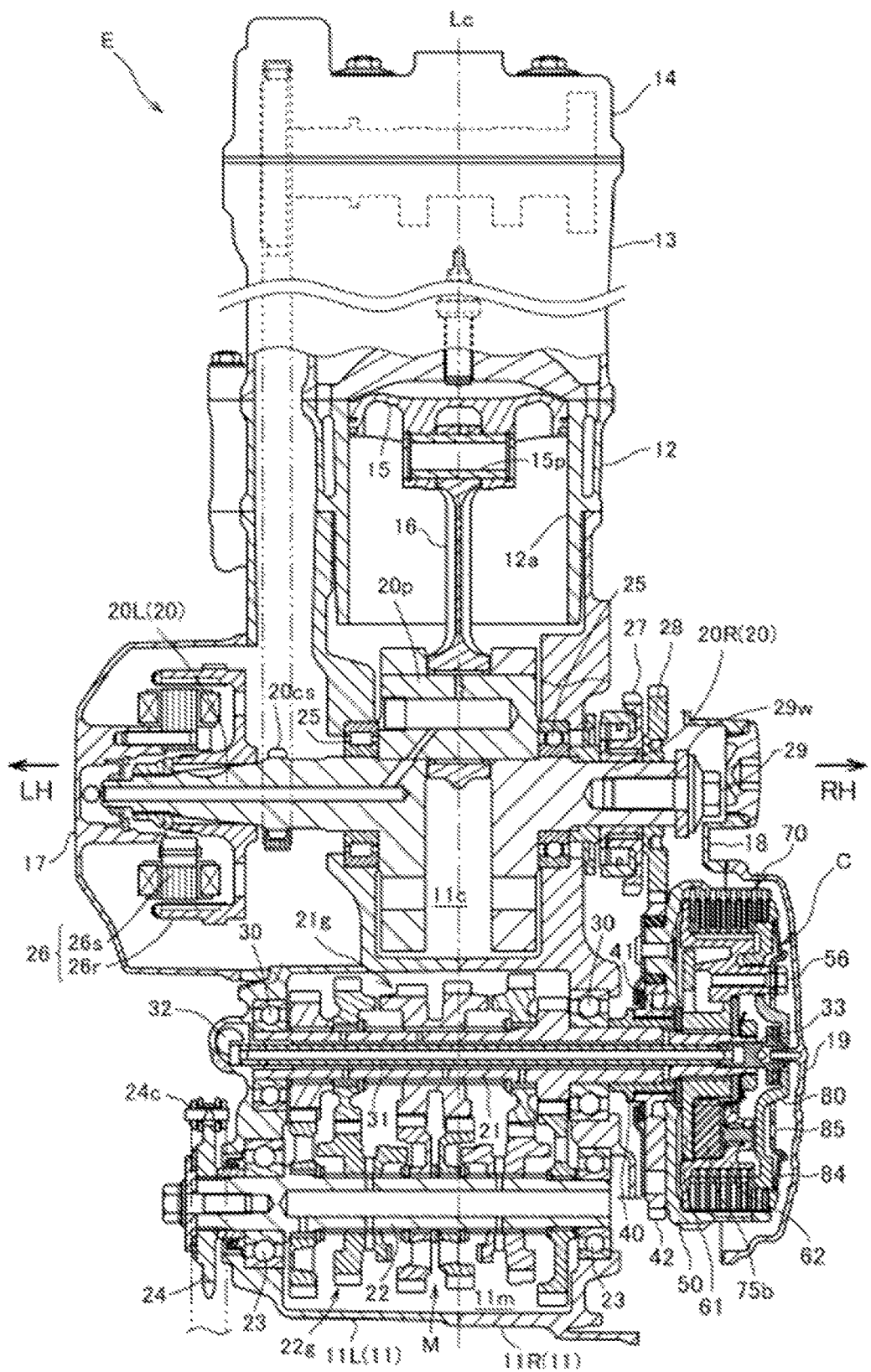
FIG. 2 is a cross-sectional development view of the internal combustion engine as seen from an arrow II-II in FIG. 1.

FIG. 1 is a right side view of an internal combustion engine E according to an embodiment using the present invention, from which a case cover is removed. FIG. 2 is a cross-sectional development view of the internal combustion engine E (cross-sectional development view as seen from an arrow II-II in FIG. 1).

The internal combustion engine E is a single-cylinder four-stroke internal combustion engine to be mounted on a motorcycle.

Note that, in the description of this specification, the front-rear and the right-left directions follow the normal standard in which an advancing direction of a motorcycle 1 according to this embodiment is defined as a front direction, and in the drawings, the reference signs "FR," "RR," "LH," and "RH" denote a front direction, a rear direction, a left-hand direction, and a right-hand direction, respectively.

A crankcase 11 is directed in a right-left vehicle-width direction of the motorcycle 1 and axially supports a crankshaft 20. The crankcase 11 forms a crank chamber 11c, in which the crankshaft 20 is disposed, and also forms a transmission chamber 11m behind the crank chamber 11c. The transmission chamber 11m is separated by a partition wall and houses a transmission M.

The internal combustion engine E includes an engine body above the crank chamber 11c of the crankcase 11, and the engine body is composed of a cylinder block 12, a cylinder head 13, and a cylinder head cover 14. The cylinder block 12 has one cylinder 12a. The cylinder head 13 is fastened to the top of the cylinder block 12 by stud bolts via a gasket. The cylinder head cover 14 is joined to the top of the cylinder head 13.

The cylinder block 12, the cylinder head 13, and the cylinder head cover 14 that are stacked on the crankcase 11 extend upward from the crankcase 11, in the state of being slightly tilted forward.

In the transmission chamber 11m of the crankcase 11, a main shaft 21 and a countershaft 22 of the transmission M are disposed while being directed in a right-left horizontal direction in parallel to the crankshaft 20.

The crankcase 11 is divided at a plane including a cylinder axis Lc and being orthogonal to the crankshaft 20, into two right and left parts, that is, a pair of left crankcase 11L and right crankcase 11R, and they are joined in a state in which respective mating surfaces are fitted together.

The right and left crankcases 11R and 11L in a combined state form a circular opening above the crank chamber 11c. A lower part of the cylinder 12a of the cylinder block 12 is inserted into the circular opening, and a piston 15 is slidably fitted in a cylinder bore of the cylinder 12a in a reciprocatable manner.

The piston 15 and the crankshaft 20 are connected by a connecting rod 16 that is axially supported at a smaller end by a piston pin 15p of the piston 15 and at a larger end by a crank pin 20p of the crankshaft 20, whereby a crank mechanism is constructed.

A left shaft body 20L protruding to the left side from a left main bearing 25 of the crankshaft 20 penetrates through a chain chamber and then further penetrates through an opening of a left side wall of the left crankcase 11L. The left shaft body 20L is formed with a drive cam chain sprocket 20cs at a part corresponding to the chain chamber and is fitted with an outer rotor 26r of an AC generator 26 at a left end.

A left side cover 17 closes the opening of the left side wall of the left crankcase 11L and covers the AC generator 26 while supporting an inner stator 26s of the AC generator 26.

On the other hand, a right shaft body 20R of the crankshaft 20 protrudes to the right side from a right main bearing 25 of the right crankcase 11R. A starter driven gear 27 and a primary drive gear 28 are fitted to the right shaft body 20R in this order from the main bearing 25 and are fixed by a flange bolt 29 via a washer 29w.

The transmission M, which is disposed in the transmission chamber 11m behind the crank chamber 11c, includes a group of main gears 21g, a group of counter gears 22g, and a gear shift mechanism (not shown) of a shift drum and a shift fork operated by a gear shift control mechanism. The main gears 21g and the counter gears 22g are axially supported by the main shaft 21 and the countershaft 22, respectively.

The main shaft 21 is positioned obliquely above and rearward of the crankshaft 20 and is axially supported by the right and left crankcases 11R and 11L via bearings 30 and 30 in a rotatable manner. The main shaft 21 is provided with a multiple-disc friction clutch C at a part protruding to the right side from the right bearing 30.

The countershaft 22 is positioned obliquely above and rearward of the crankshaft 20 and is axially supported by the right and left crankcases 11R and 11L via bearings 23 and 23 in a rotatable manner. The countershaft 22 penetrates toward the left of the left bearing 23 and protrudes to the outside to function as an output shaft, and it is fitted with a drive chain sprocket 24 at a protruding left end.

A drive chain 24c is wound around the drive chain sprocket 24 and is also wound around a driven chain sprocket (not shown) on a rear wheel side, whereby power is transmitted to the rear wheel.

A right case cover 18 covers a right side surface of the right crankcase 11R and opens at the multiple-disc friction clutch C. A clutch cover 19 covers a right side of the multiple-disc friction clutch C to close this opening.

The main shaft 21 is formed with a shaft hole 21h at the shaft center, and a clutch operation rod 31 is inserted into the shaft hole 21h.

The clutch operation rod 31 is slidably supported by right and left reduced-diameter parts of the shaft hole 21h and is moved to the right side in the axial direction by operation of a clutch cam 32 that acts on a left end.

In addition, the shaft hole 21h is supplied with oil that is ejected from a scavenge pump.

Figure 3:
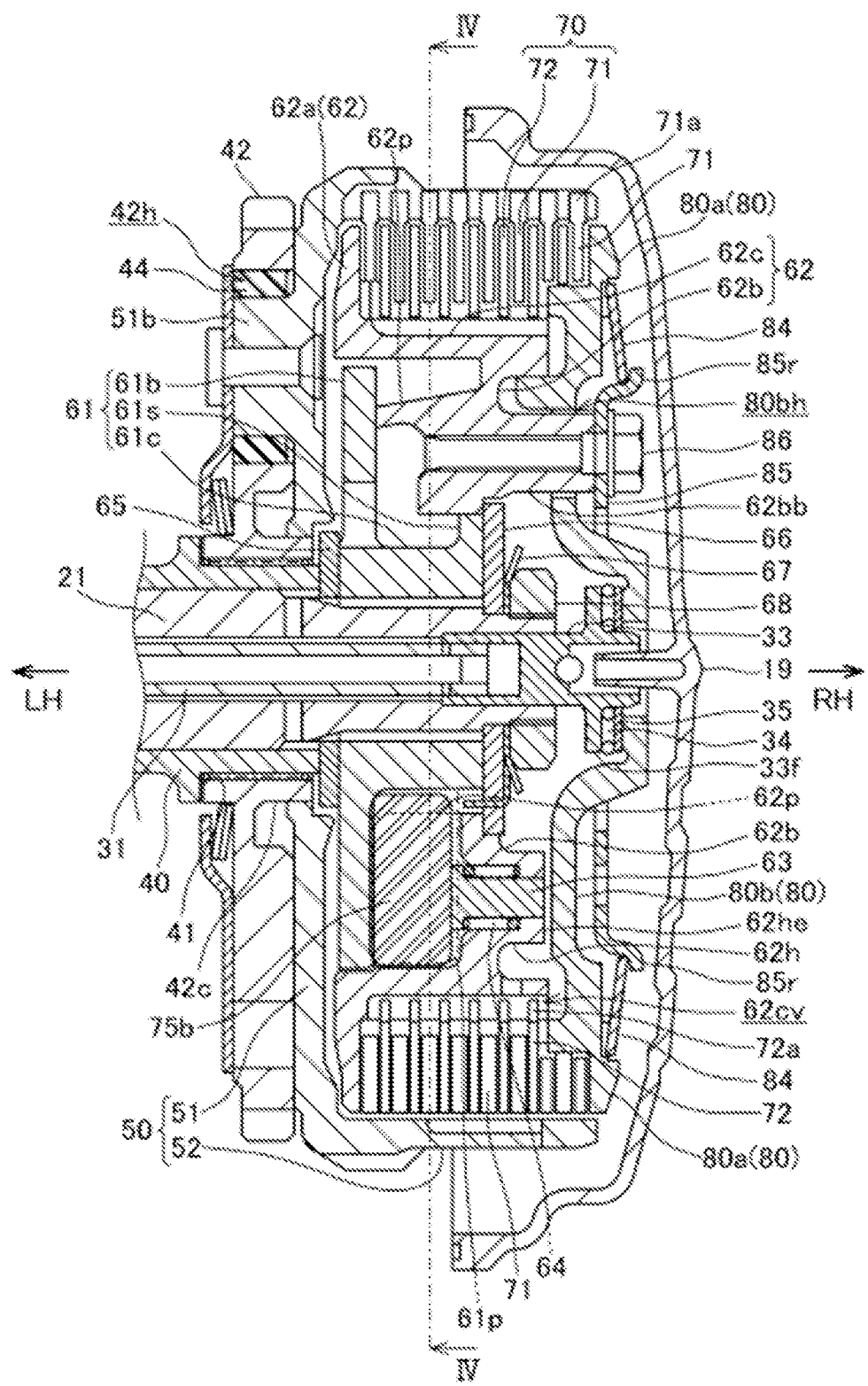
FIG. 3 is a sectional view of a multiple-disc friction clutch of the embodiment.

With reference to FIGS. 2 and 3, a sleeve member 40 is fitted onto the main shaft 21 in contact with an inner race of the right bearing 30 from a right side, and it axially supports a primary driven gear 42 via a needle bearing 41 in a rotatable manner.

The primary driven gear 42 meshes with the primary drive gear 28, which is fitted to the crankshaft 20.

A clutch housing 50 of the multiple-disc friction clutch C has a housing side wall 51 that is axially supported by the main shaft 21 in a rotatable manner, and a plurality of engaging protrusion pieces 52 protrude to the right side in the axial direction from an outer circumferential edge of the housing side wall 51.

The plurality of engaging protrusion pieces 52 are arranged at intervals in the circumferential direction.

This housing side wall 51 of the clutch housing 50 is axially supported by a center cylindrical boss 42c of the primary driven gear 42 while being in contact with a disc part of the primary driven gear 42.

A damper rubber 44 is press-fitted and held by an outer circumference of a holding boss 51b that protrudes on an outer surface of the housing side wall 51. The damper rubber 44 is inserted into a circular hole 42h that is formed in the disc part of the primary driven gear 42, so as to absorb rapid variations in torque between the primary driven gear 42 and the clutch housing 50.

Thus, rotation of the crankshaft 20 is transmitted to rotation of the clutch housing 50 of the multiple-disc friction clutch C via meshing between the primary drive gear 28 and the primary driven gear 42 and via the damper rubber 44.

The multiple-disc friction clutch C includes a clutch center that is composed of a first clutch center 61 and a second clutch center 62. The first clutch center 61 is spline-fitted to a right end part of the main shaft 21, which is an output rotation shaft. The second clutch center 62 is relatively rotatably supported by the first clutch center 61.

Figure 4:
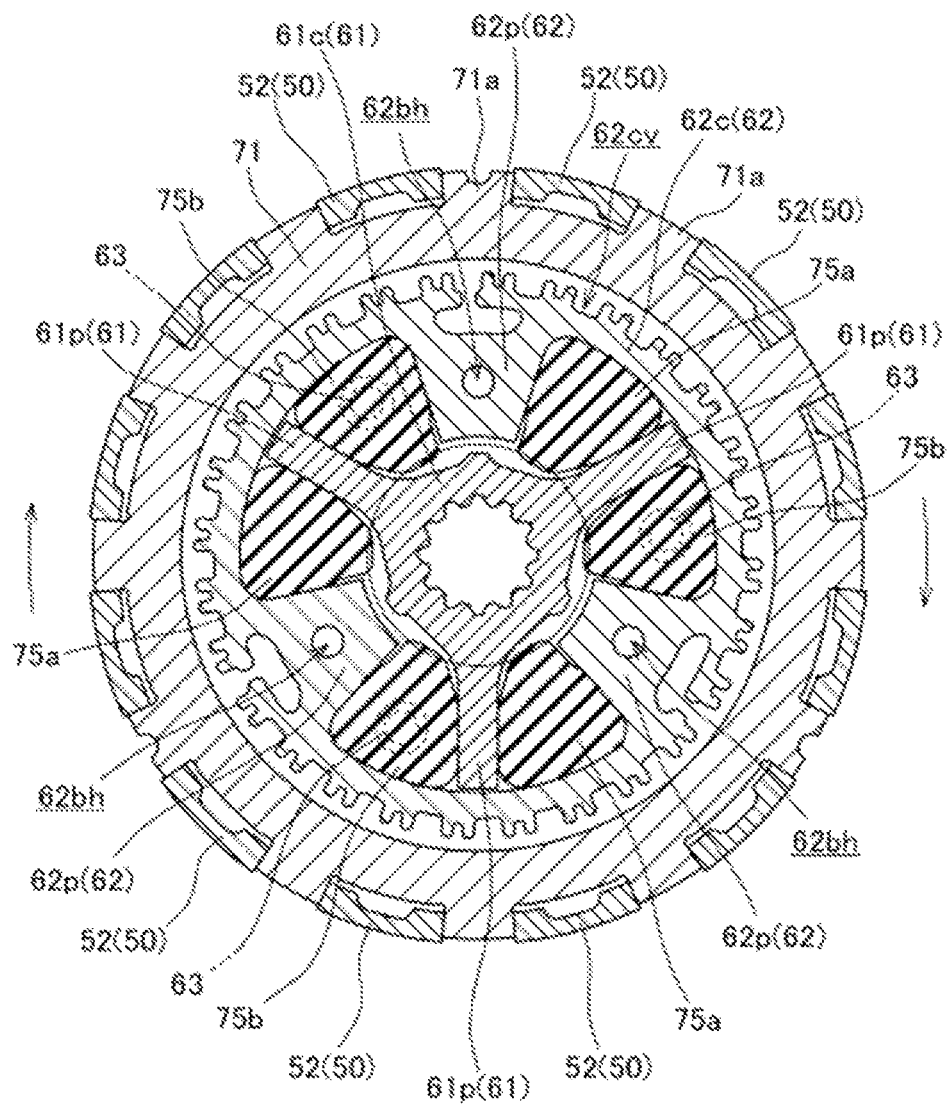
FIG. 4 is a sectional view of the multiple-disc friction clutch as seen from an arrow IV-IV in FIG. 3.

With reference to FIGS. 3 and 4, the first clutch center 61 has a clutch-center side wall 61b, a clutch-center cylindrical boss 61c, and three pressing partition walls 61p. The clutch-center side wall 61b has a hollow disc shape and faces an inner surface of the housing side wall 51. The clutch-center cylindrical boss 61c cylindrically extends from an inner circumferential edge of the clutch-center side wall 61b to a side (right side) opposite to the housing side wall 51. The pressing partition walls 61p extend to the right side from the clutch-center side wall 61b as well as extend radially outward from the clutch-center cylindrical boss 61c.

The three pressing partition walls 61p extend at equal intervals in the circumferential direction and partition a right space of the clutch-center side wall 61b into three fan-shaped spaces (refer to FIG. 4).

Spline grooves are formed in an inner circumferential surface of the clutch-center cylindrical boss 61c.

In addition, a support protrusion 61s radially protrudes at each of three positions between the three pressing partition walls 61p, at a right end of the clutch-center cylindrical boss 61c.

The three support protrusions 61s have the same protrusion length and have tips at equal distances from a center axis.

This first clutch center 61 is spline-fitted and is axially supported by the right end part of the main shaft 21 in a relatively non-rotatable manner while being held between washers 65 and 66. The first clutch center 61 is fitted to the main shaft 21 by screwing and fastening a nut 68 to a right end of the main shaft 21 via a lock washer 67.

On the other hand, the second clutch center 62 has a clutch-center cylindrical part 62c with an inner diameter slightly greater than an outer diameter of the clutch-center side wall 61b of the first clutch center 61. A right end part of the clutch-center cylindrical part 62c radially inwardly extends to form a clutch-center inner side wall 62b having a hollow disc shape, at a position facing the clutch-center side wall 61b of the first clutch center 61. A left end part of the clutch-center cylindrical part 62c radially outwardly extends to form a clutch-center outer side wall 62a having a hollow disc shape, at an outer circumference of the clutch-center side wall 61b of the first clutch center 61.

The plurality of engaging protrusion pieces 52, which are arranged in the circumferential direction of the clutch housing 50, are positioned on a concentric circle separated outward from the clutch-center cylindrical part 62c of the second clutch center 62 by a predetermined distance.

That is, an annular space is formed between the clutch-center cylindrical part 62c and the plurality of engaging protrusion pieces 52 that concentrically overlap each other, and the clutch-center outer side wall 62a is positioned on a left side in this annular space.

A plurality of groove lines 62cv are formed in the circumferential direction so as to be directed in the axial direction, in an outer circumferential surface of the clutch-center cylindrical part 62c of the second clutch center 62.

A plurality of friction plates 71 and clutch plates 72 are alternately inserted and fitted in the annular space between the clutch-center cylindrical part 62c and the plurality of engaging protrusion pieces 52 that concentrically overlap each other, whereby they constitute a clutching part 70.

The friction plate 71 has a plurality of outer circumferential protrusions 71a that are formed on an outer circumferential edge. The outer circumferential protrusions 71a are fitted into spaces between the plurality of engaging protrusion pieces 52 of the clutch housing 50, in an axially slidable manner (refer to FIGS. 3 and 4). Thus, the friction plate 71 rotates together with the clutch housing 50.

On the other hand, the clutch plate 72 has a plurality of inner circumferential protrusions 72a that are formed on an inner circumferential edge. The inner circumferential protrusions 72a slidably engage with the plurality of groove lines 62cv, which are formed in the circumferential direction so as to be directed in the axial direction in the outer circumferential surface of the clutch-center cylindrical part 62c of the second clutch center 62 (refer to FIG. 3). Thus, the clutch plate 72 rotates together with the second clutch center 62.

The clutch-center inner side wall 62b of the second clutch center 62 faces the clutch-center side wall 61b of the first clutch center 61 and has three pressing partition parts 62p that extend to the left side from the clutch-center inner side wall 62b as well as radially inwardly extend from the clutch-center cylindrical part 62c.

The three pressing partition parts 62p extend at equal intervals in the circumferential direction and partition a left space of the clutch-center inner side wall 62b into three fan-shaped spaces (refer to FIG. 4).

As shown in FIG. 4, an annular space between the clutch-center side wall 61b of the first clutch center 61 and the clutch-center inner side wall 62b of the second clutch center 62, which face each other, and between the clutch-center cylindrical boss 61c and the clutch-center cylindrical part 62c, which concentrically overlap each other, is approximately equally partitioned into six spaces by the three pressing partition walls 61p of the first clutch center 61 and the three pressing partition parts 62p of the second clutch center 62, which are alternately disposed in the circumferential direction, and rubber dampers 75a and 75b are interposed in these six spaces.

Thus, as shown in FIG. 4, each of the rubber dampers 75a and 75b is held between the pressing partition wall 61p of the first clutch center 61 and the pressing partition part 62p of the second clutch center 62 and has a fan shape, in an axial view.

With reference to FIG. 4, the rotation direction of the multiple-disc friction clutch C is as shown by the arrows.

The rubber dampers 75a and 75b are alternately disposed in the circumferential direction. Among them, in terms of the rotation direction shown by the arrows, each of three rubber dampers 75a is held between the pressing partition part 62p of the second clutch center 62 on the upstream side and the pressing partition wall 61p of the first clutch center 61 on the downstream side, whereas each of three rubber dampers 75b is held between the pressing partition wall 61p of the first clutch center 61 on the upstream side and the pressing partition part 62p of the second clutch center 62 on the downstream side.

As shown in FIG. 3, the second clutch center 62 is relatively rotatably supported in a state in which inner circumferential surfaces of the three pressing partition parts 62p are in sliding contact with outer circumferential surfaces of the three support protrusions 61s of the first clutch center 61.

In addition, with reference to FIG. 3, the inner circumferential surface of the pressing partition part 62p, which is in sliding contact with the outer circumferential surface of the support protrusion 61s of the first clutch center 61, is positioned on the radially inside and on the left side of an outer circumferential surface of the washer 66 having a larger diameter than the inner circumferential surface of the pressing partition part 62p, whereby the second clutch center 62 is limited in movement to the right side. Moreover, a left end surface of the pressing partition part 62p is in contact with the clutch-center side wall 61b of the first clutch center 61, whereby the second clutch center 62 is limited also in movement to the left side.

A cylindrical bolt attaching boss 62bb having a bolt hole 62bh is formed at each of three parts having respective pressing partition parts 62p of the clutch-center inner side wall 62b of the second clutch center 62, in such a manner as to protrude to the right side.

Moreover, the clutch-center inner side wall 62b of the second clutch center 62 is formed with a cylindrical opening part 62h that penetrates in the axial direction, at each of three parts respectively facing the rubber dampers 75b, which are each held between the pressing partition wall 61p of the first clutch center 61 on the upstream side and the pressing partition part 62p of the second clutch center 62 on the downstream side, among the six interposed rubber dampers 75a and 75b.

A push rod 63 is axially movably inserted and fitted into the cylindrical opening part 62h.

Figure 5:
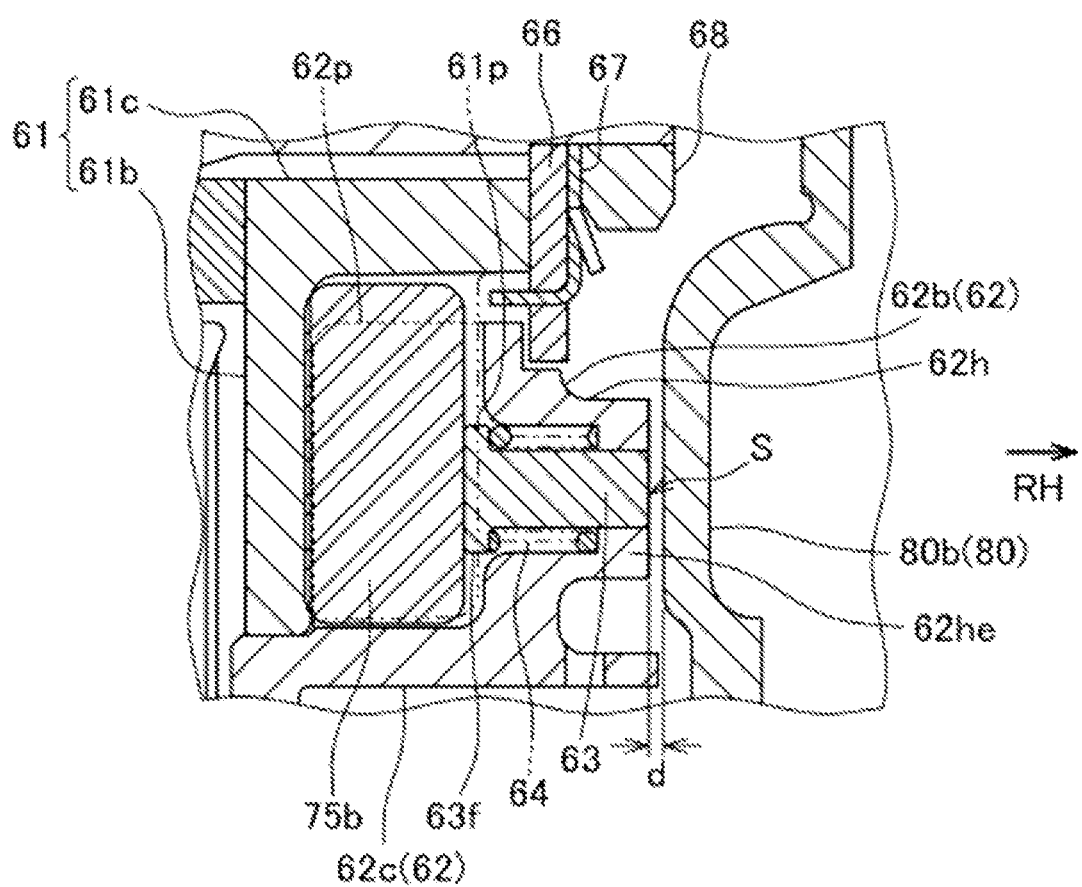
FIG. 5 is a sectional view of a main part of the multiple-disc friction clutch.

With reference to FIG. 5, the push rod 63 has a flange 63f at an end on the rubber damper 75b side, the cylindrical opening part 62h has an inner diameter that is slightly greater than an outer diameter of the flange 63f and has a reduced-diameter part 62he at an end on a side opposite to the rubber damper 75b, and the reduced-diameter part 62he has an inner diameter equal to an outer diameter of the push rod 63.

The push rod 63 penetrates through the cylindrical opening part 62h to be inserted and fitted into the reduced-diameter part 62he. The push rod 63 is biased so as to abut on the rubber damper 75b by a coil spring 64 that is interposed between the flange 63f of the push rod 63 and the reduced-diameter part 62he of the cylindrical opening part 62h in the cylindrical opening part 62h.

The push rod 63 is inserted and fitted into each of the three cylindrical opening parts 62h at equal intervals in the circumferential direction of the clutch-center inner side wall 62b of the second clutch center 62, while being in contact with the rubber damper 75b.

The clutch-center outer side wall 62a of this second clutch center 62 faces the clutching part 70, in which the plurality of friction plates 71 and clutch plates 72 are alternately inserted and fitted, and a pressure plate 80 and this clutch-center outer side wall 62a hold the clutching part 70 therebetween while the pressure plate 80 presses the clutching part 70.

The pressure plate 80 has a disc shape, and an outer circumferential side wall 80a presses the plurality of alternately stacked friction plates 71 and clutch plates 72, against the clutch-center outer side wall 62a, from a right side.

The center of the pressure plate 80 is expanded to the right side to form a center boss 80c, and the pressure plate 80 continues to the outer circumferential side wall 80a via an inner circumferential side wall 80b that radially extends from the center boss 80c.

With reference to FIG. 3, a cap member 33 covers an end (right end) of the clutch operation rod 31 and protrudes from a shaft end opening of the main shaft 21 to form a flange 33f. This flange 33f faces an annular side plate 35 that is abutted on the center boss 80c of the pressure plate 80, whereby the flange 33f and the annular side plate 35 hold a thrust bearing 34 therebetween.

The inner circumferential side wall 80b of the pressure plate 80 faces the clutch-center inner side wall 62b of the second clutch center 62 and is formed with a circular hole 80bh for passing each of the three bolt attaching bosses 62bb, which are formed so as to protrude to the right side from the clutch-center inner side wall 62b.

A set plate 85 having a hollow disc shape is abutted from a right side to a right end surface of each of the three bolt attaching bosses 62bb that penetrate to protrude from the inner circumferential side wall 80b of the pressure plate 80, and a bolt 86 is tightened to each of the three bolt attaching bosses 62bb.

The center boss 80c of the pressure plate 80 protrudes to the right side from the hollow part of the set plate 85.

A disc spring 84 is compressed and interposed between a spring receiving part 85r that is bent at an outer circumferential edge of the set plate 85, and a back surface (right side surface) of the outer circumferential side wall 80a of the pressure plate 80.

Thus, the pressure plate 80 is biased axially inward (to the left side) by the spring force of the disc spring 84, and the outer circumferential side wall 80a of the pressure plate 80 and the clutch-center outer side wall 62a press and hold the alternately stacked friction plates 71 and clutch plates 72 therebetween. Under these conditions, rotation of the clutch housing 50 is transmitted to the second clutch center 62 via the friction plates 71 and the clutch plates 72 that are in pressure contact with each other, whereby the clutch is engaged.

In response to the clutch operation rod 31 moved to the right side by the action of the clutch cam 32, the pressure plate 80 is pressed to the right side via the cap member 33 and the thrust bearing 34 and is moved to the right side against the biasing force of the disc spring 84. Then, the friction plates 71 and the clutch plates 72 in the state of being pressed and held between the pressure plate 80 and the clutch-center outer side wall 62a are released. Thus, rotation of the clutch housing 50 is not transmitted to the second clutch center 62, whereby the clutch is disengaged.

With reference to FIG. 4, when rotation of the clutch housing 50 is transmitted to the second clutch center 62 in the state in which the clutch is engaged, rotation of the second clutch center 62 makes the pressing partition part 62p of the second clutch center 62 on the upstream side approach the pressing partition wall 61p of the first clutch center 61 on the downstream side to press and hold the rubber damper 75a. Thus, rotation of the second clutch center 62 is transmitted to rotation of the first clutch center 61 via the rubber damper 75a that is pressed and held, whereby power is transmitted.

In this state, the push rod 63 does not operate although the rubber damper 75a is compressed and deformed, and therefore, the pressure plate 80 is not pushed back, and the clutch capacity is not reduced.

On the other hand, when rotation of the main shaft 21 is transmitted to the first clutch center 61 in the state in which the clutch is engaged, that is, when back torque acts, rotation of the first clutch center 61 makes the pressing partition wall 61p of the first clutch center 61 on the upstream side approach the second clutch center 62 on the downstream side to press and hold the rubber damper 75b. Thus, rotation of the first clutch center 61 is transmitted to rotation of the second clutch center 62 via the rubber damper 75b that is pressed and held, whereby power is transmitted.

In this manner, power is transmitted between the first clutch center 61 and the second clutch center 62 via the rubber dampers 75a and 75b, and elastic deformation of the rubber dampers 75a and 75b causes a very little delay in response, which hardly affects operability.

In addition, vibrations due to relative rotation between the first clutch center 61 and the second clutch center 62 are reduced by damping forces of the rubber dampers 75a and 75b.

In the state in which the rubber damper 75b is not pressed and held and is thereby not compressed and deformed, an end of the push rod 63, which is biased to abut on the rubber damper 75b by the coil spring 64, is positioned at the opening of the cylindrical opening part 62h, in the cylindrical opening part 62h, as shown in FIG. 5. That is, the push rod 63 has a gap S with a distance d between the end thereof and the pressure plate 80, which faces the clutch-center inner side wall 62b of the second clutch center 62 having the cylindrical opening part 62h.

Figure 6:
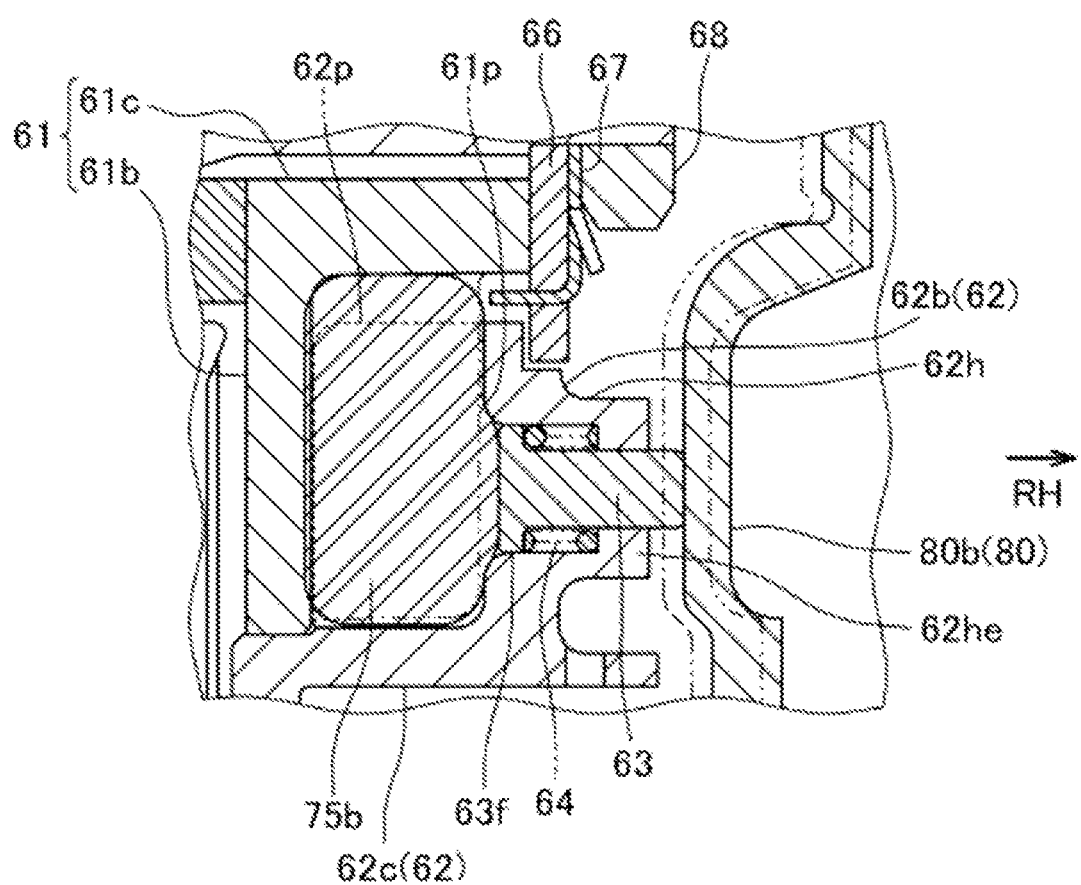
FIG. 6 is a sectional view of the main part of the multiple-disc friction clutch in another state.

On the other hand, in the state in which the rubber damper 75b is pressed and held due to back torque, the rubber damper 75b is compressed and deformed to be expanded to the cylindrical opening part 62h that is opened, as shown in FIG. 6. The rubber damper 75b then presses the push rod 63 against the biasing force of the coil spring 64 and pushes the push rod 63 out of the cylindrical opening part 62h.

The protrusion amount from the cylindrical opening part 62h of the push rod 63 varies depending on the degree of the force for pressing and holding the rubber damper 75b, that is, the degree of back torque.

A great back torque makes the push rod 63 protrude from the cylindrical opening part 62h by a large protrusion amount. As the protrusion amount exceeds the distance d of the gap S between the push rod 63 and the pressure plate 80, the end of the push rod 63 comes into contact with the pressure plate 80 and then moves the pressure plate 80 to the right side against the biasing force of the disc spring 84, as shown in FIG. 6.

Movement to the right side of the pressure plate 80 loosens the friction plates 71 and the clutch plates 72 in the state of being pressed and held between the pressure plate 80 and the clutch-center outer side wall 62a, resulting in a reduction in clutch capacity.

With this structure, at the time a great back torque acts due to engine braking, it is possible to reduce the clutch capacity and prevent rapid braking from acting on a tire.

With reference to FIG. 4, the push rod 63 is inserted and fitted in each of the three cylindrical opening parts 62h, which are provided at equal intervals in the circumferential direction of the clutch-center inner side wall 62b of the second clutch center 62. In this structure, in response to protrusion of the three push rods 63, which are disposed at equal intervals in the circumferential direction (shown by the imaginary lines in FIG. 4), forces of the push rods 63 for pushing back the pressure plate 80 against the biasing force of the disc spring 84 are uniformly applied to the pressure plate 80 and thereby smoothly moves the pressure plate 80.

As shown in FIG. 5, the push rod 63 is biased to abut on the rubber damper 75b by the coil spring 64, and thus, operation responsiveness of the pressure plate 80 with respect to compression deformation of the rubber damper 75b can be adjusted.

As shown in FIG. 5, the gap S is provided between the push rod 63 and the pressure plate 80. When relative rotation in mutually opposite directions of the first clutch center 61 and the second clutch center 62 is repeated while variations in torque are great at the time of starting a vehicle at a high number of revolutions, movement of the push rod 63 based on compression deformation of the rubber damper 75b is absorbed by the gap S between the push rod 63 and the pressure plate 80 with the use of compression deformation of the rubber damper 75b and stiffness of the coil spring 64. Thus, the pressure plate 80 is not pushed back, whereby reduction in clutch capacity is prevented, and starting operation is smoothly performed.

Figure 7:
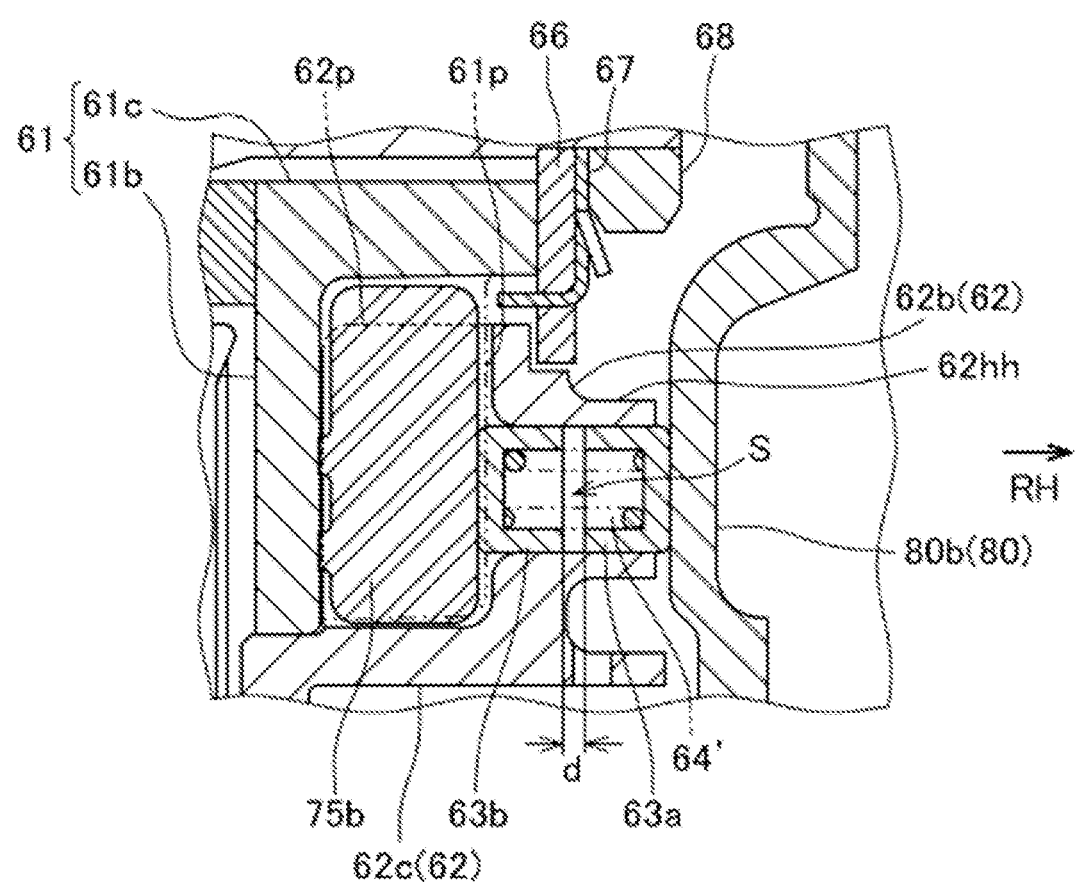
FIG. 7 is a sectional view of a main part of a multiple-disc friction clutch of another embodiment.
Figure 8:
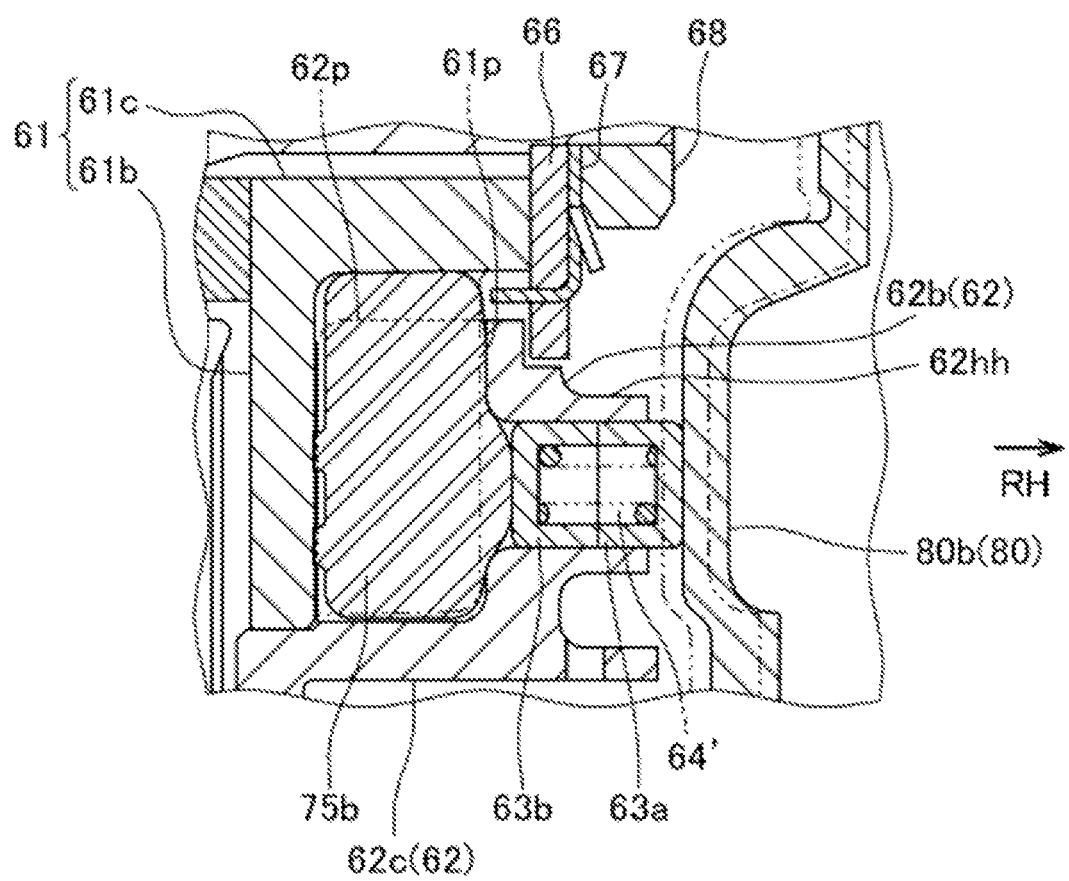
FIG. 8 is a sectional view of the main part of the multiple-disc friction clutch of the another embodiment in another state.

Next, a multiple-disc friction clutch of another embodiment is illustrated in FIGS. 7 and 8.

This embodiment corresponds to a modification example of the push rod and is the same as the above-described embodiment except for the push rod and the operation structure of the push rod. The same members are illustrated by using the same reference signs.

The push rod according to this embodiment is composed of a first push rod 63a for pushing the pressure plate 80 and a second push rod 63b in pressure contact with the rubber damper 75b, and it is inserted and fitted in a cylindrical opening part 62hh that is formed in the clutch-center inner side wall 62b of the second clutch center 62.

The first push rod 63a and the second push rod 63b each have a bottomed cylindrical shape and are inserted and fitted in the cylindrical opening part 62hh while openings thereof face each other. A coil spring 64' is compressed and interposed between the first push rod 63a and the second push rod 63b.

The cylindrical opening part 62hh does not have a reduced-diameter part at an end and has a simple circular hole inside thereof.

In the state in which the rubber damper 75b is not pressed and held and is thereby not compressed and deformed, in accordance with biasing of the coil spring 64', the first push rod 63a contacts and presses the pressure plate 80, whereas the second push rod 63b is in pressure contact with the rubber damper 75b, as shown in FIG. 7. In this state, the first push rod 63a and the second push rod 63b are spaced in a contactable manner by the coil spring 64' that is interposed therebetween in a compressed state, and a gap S with a distance w is formed therebetween.

In the state in which the rubber damper 75b is pressed and held due to back torque, the rubber damper 75b is compressed and deformed to be expanded to the cylindrical opening part 62*hh* that is opened, as shown in FIG. 8. The rubber damper 75*b* then presses the second push rod 63*b* against the biasing force of the coil spring 64' to eliminate the gap S and brings the second push rod 63*b* into contact with the first push rod 63*a*.

In response to action of a great back torque, the second push rod 63*b* comes into contact with the first push rod 63*a* and then further moves to the right side together with the first push rod 63*a* and the pressure plate 80.

Movement to the right side of the pressure plate 80 loosens the friction plates 71 and the clutch plates 72 in the state of being pressed and held between the pressure plate 80 and the clutch-center outer side wall 62*a*, resulting in a reduction in clutch capacity.

As shown in FIG. 7, the gap S is provided between the first push rod 63*a* and the second push rod 63*b*. When relative rotation in mutually opposite directions of the first clutch center 61 and the second clutch center 62 is repeated while variations in torque are great at the time of starting a vehicle at a high number of revolutions, movement of the first push rod 63*a* based on compression deformation of the rubber damper 75*b* is absorbed by the gap S between the first push rod 63*a* and the second push rod 63*b*. Thus, the pressure plate 80 is not pushed back, whereby reduction in clutch capacity is prevented, and starting operation is smoothly performed.

The multiple-disc friction clutches according to the above-described embodiments can be easily adjusted in clutch capacity by exchanging the rubber damper for an elastic member being different in modulus of elasticity, dimensions, and shape, or by exchanging the push rod for one having a different length.

Although the multiple-disc friction clutches according to the embodiments of the present invention are described above, embodiments of the present invention are not limited to the foregoing embodiments and also include those implemented in various forms within the gist of the present invention.

REFERENCE SIGNS LIST

E . . . internal combustion engine, M . . . transmission, C . . . multiple-disc friction clutch, 1 . . . motorcycle, 20 . . . crankshaft, 21 . . . main shaft (output rotation shaft), 22 . . . counter shaft, 28 . . . primary drive gear, 30 . . . bearing, 31 . . . clutch operation rod, 32 . . . clutch cam, 33 . . . cap member, 33*f* . . . flange, 34 . . . thrust bearing, 35 . . . annular side plate, 40 . . . sleeve member, 41 . . . needle bearing, 42 . . . primary driven gear, 50 . . . clutch housing, 51 . . . housing side wall, 52 . . . engaging protrusion piece, 61 . . . first clutch center, 61*b* . . . clutch-center side wall, 61*c* . . . clutch-center cylindrical boss, 61*p* . . . pressing partition wall, 61*s* . . . support protrusion, 62 . . . second clutch center, 62*a* . . . clutch-center outer side wall, 62*b* . . . clutch-center inner side wall, 62*c* . . . clutch-center cylindrical part, 62*p* . . . pressing partition part, 62*bb* . . . bolt attaching boss, 62*h* . . . cylindrical opening part, 62*hh* . . . cylindrical opening part, 63 . . . push rod, 63*a* . . . first push rod, 63*b* . . . second push rod, 64 . . . coil spring, 64' . . . coil spring, 65 . . . washer, 66 . . . washer, 67 . . . lock washer, 68 . . . nut, 70 . . . clutching part, 71 . . . friction plate (plate member), 72 . . . clutch plate (plate member), 75*a* . . . rubber damper, 75*b* . . . rubber damper, 80" . . . pressure plate, 80*a* . . . outer circumferential side wall, 80*b* . . . inner circumferential side wall, 80*bh* . . . circular hole, 80*c* . . . center boss, 84 . . . disc spring, 85 . . . set plate, and 86 . . . bolt.

What is claimed is:

1. A multiple-disc friction clutch comprising:
    a clutch housing being axially supported by an output rotation shaft in a rotatable manner and being configured to receive drive torque from an internal combustion engine;
    clutch centers being coupled to the output rotation shaft;
    a clutching part including a plurality of plate members that are configured to transmit and shut off torque between the clutch housing and the clutch centers;
    a pressure plate being configured to press the clutching part against the clutch center; and
    a biasing member biasing the pressure plate in a direction of pressing the clutching part,
    the clutch centers including a first clutch center and a second clutch center, the first clutch center being axially supported by the output rotation shaft in a relatively non-rotatable manner, the second clutch center being supported by the first clutch center in a relatively rotatable manner and holding the clutching part between the pressure plate and the second clutch center,
    elastic members being interposed between the first clutch center and the second clutch center and being configured to be compressed and deformed by relative rotation of the first clutch center and the second clutch center so as to transmit power,
    the second clutch center having a side wall that faces the pressure plate and having an opening part that penetrates in an axial direction, at a position facing the elastic member of the side wall,
    a push rod being inserted and fitted in the opening part and being configured to be moved in the axial direction by compression deformation of the elastic member so as to press the pressure plate.

2. The multiple-disc friction clutch according to claim 1, wherein the push rod is configured to be moved in the axial direction by the elastic member that is compressed and deformed only when power is transmitted from the first clutch center to the second clutch center.

3. The multiple-disc friction clutch according to claim 2, wherein a plurality of the push rods are provided to the side wall of the second clutch center at equal intervals in a circumferential direction.

4. The multiple-disc friction clutch according to claim 2, wherein the push rod is biased so as to be in contact with the elastic member, by a spring member.

5. The multiple-disc friction clutch according to claim 4, wherein a gap is provided between the push rod and the pressure plate.

6. The multiple-disc friction clutch according to claim 4, wherein the push rod includes a first push rod for pressing the pressure plate and a second push rod being in pressure contact with the elastic member, and
    the first push rod and the second push rod are spaced in a contactable manner by the spring member that is interposed therebetween in a compressed state.

7. The multiple-disc friction clutch according to claim 3, wherein the push rod is biased so as to be in contact with the elastic member, by a spring member.

\* \* \* \* \*